United States Patent
Knas et al.

(10) Patent No.: US 11,057,739 B1
(45) Date of Patent: *Jul. 6, 2021

(54) MOBILE DEVICE NOTIFICATION GENERATION

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,082

(22) Filed: Oct. 21, 2019

Related U.S. Application Data

(63) Continuation of application No. 16/151,699, filed on Oct. 4, 2018, now Pat. No. 10,511,936, which is a continuation of application No. 15/686,053, filed on Aug. 24, 2017, now Pat. No. 10,111,041, which is a
(Continued)

(51) Int. Cl.
| | |
|---|---|
| *H04W 64/00* | (2009.01) |
| *H04W 4/02* | (2018.01) |
| *G01S 19/47* | (2010.01) |
| *G06F 3/147* | (2006.01) |
| *H04L 29/08* | (2006.01) |
| *B60T 17/22* | (2006.01) |
| *H04L 12/58* | (2006.01) |

(Continued)

(52) U.S. Cl.
CPC ............. *H04W 4/027* (2013.01); *B60T 17/22* (2013.01); *G01S 19/13* (2013.01); *G01S 19/47* (2013.01); *G06F 3/147* (2013.01); *H04L 51/04* (2013.01); *H04L 51/046* (2013.01); *H04L 51/20* (2013.01); *H04L 67/04* (2013.01); *H04L 67/125* (2013.01); *H04L 67/306* (2013.01); *H04L 67/34* (2013.01); *H04W 4/14* (2013.01)

(58) Field of Classification Search
CPC ..... H04W 4/008; H04W 64/00; H04W 12/06; H04W 4/12; H04W 68/005; H04W 4/16; H04W 4/027; H04W 4/046; H04W 52/0241; H04W 76/048; H04B 7/14; A61B 5/118; A61B 5/1473; A61B 5/744; G06F 19/322; G06F 19/3418; G06Q 40/08; G01C 21/3697; G07C 5/008; G07C 5/0858
See application file for complete search history.

(56) References Cited

U.S. PATENT DOCUMENTS

| | | |
|---|---|---|
| 9,756,474 B1 | 9/2017 | Knas et al. |
| 10,111,041 B1 | 10/2018 | Knas et al. |

(Continued)

*Primary Examiner* — Phuoc H Doan
(74) *Attorney, Agent, or Firm* — Foley & Lardner LLP

(57) ABSTRACT

The methods and software application described herein monitor the acceleration experienced by a mobile device and determine when said acceleration exceeds a predetermined acceleration threshold that may be indicative of an unusually rapid acceleration or deceleration. In the event of a sudden acceleration or deceleration, the methods and mobile application described herein automatically trigger a timely, event-related notification to the user of the mobile device, such as displaying a banner on the mobile device's display, a text, electronic mail, or voice message.

20 Claims, 5 Drawing Sheets

Related U.S. Application Data continuation of application No. 15/373,718, filed on Dec. 9, 2016, now Pat. No. 9,756,474.

(60) Provisional application No. 62/265,824, filed on Dec. 10, 2015.

(51) Int. Cl.
*H04W 4/14* (2009.01)
*G01S 19/13* (2010.01)

(56) References Cited

U.S. PATENT DOCUMENTS

| | | | |
|---|---|---|---|
| 2007/0015504 A1* | 1/2007 | Kusuda | A63F 13/26 |
| | | | 455/426.2 |
| 2014/0365981 A1 | 12/2014 | Ranney | |
| 2015/0178661 A1* | 6/2015 | Keaveny | G07C 5/085 |
| | | | 705/7.42 |
| 2015/0316579 A1 | 11/2015 | Pakzad et al. | |
| 2016/0361593 A1* | 12/2016 | Elliott | G06K 9/00342 |

* cited by examiner

MOBILE DEVICE NOTIFICATION GENERATION

CROSS REFERENCES TO RELATED APPLICATION

This application is a continuation application of U.S. patent application Ser. No. 16/151,699, filed Oct. 4, 2018, which is a continuation of U.S. patent application Ser. No. 15/686,053, filed Aug. 24, 2017, which is a continuation application of U.S. patent application Ser. No. 15/373,718, filed Dec. 9, 2016, which claims priority to U.S. Provisional Patent Application Ser. No. 62/265,824, filed Dec. 10, 2015, which are all hereby fully incorporated by reference in their entirety.

FIELD OF THE INVENTION

The present invention relates in general to methods and software applications for generating notifications using sensors.

BACKGROUND

In today's world, most people carry a cell phone, a large percentage of which are smart phones equipped with web-access, processors, and multiple communications technologies, such as voice, text, electronic mail, web browsing, and others. Smart phones, and certain other mobile devices, also typically include sensors, such as accelerometers, magnetometers, gyroscopes, light sensors, and touch pads, for collecting data from the user's environment. Most people frequently carry their smart phones with them, and usually leave them on so that they are in near-constant communication, whether through a cellular tower, wireless router, or some combination, to a LAN, WAN, VPN, or Worldwide Web. Many also download applications onto their smart phones or mobile devices, such as mobile applications for enabling two-way access to several institutions, cell phone or Internet service providers, shopping networks, or other services, companies, or institutions. As the processing power of mobile devices allow for greater functionality and the Internet technology era allows for interconnectivity between computing systems, many institutions have utilized data gathered by user's mobile devices for emergency notification purposes. However, since the implementation of these more sophisticated tools, several shortcomings in these technologies have been identified and have created a new set of challenges. For example, currently many institutions constantly monitor users' activities to detect emergencies, however, these conventional methods are inaccurate and/or consume a high percentage of mobile devices' processing power and battery life.

SUMMARY

Smart phones, tablets, and other mobile devices offer a unique resource for detecting a potential event in a user's life, such as a near-collision or loss of control in an automobile, and then providing information that is both timely and related to that event. For the aforementioned reasons, there is a need for an accurate and speedy system and method for detection of emergencies (e.g., vehicular emergencies), generation of proper notification, and timely transmittal of said notification. What is needed is an improved system and method for delivering notifications that correlates to an event in a user's life. Disclosed herein are methods and software applications for addressing the shortcomings of the art, and may provide any number of additional or alternative advantages. The systems and methods described herein provide a process for using a smart phone or other mobile device to detect an event in a consumer's life, such as an automobile accident or near-miss, and trigger content-related advertising that may be of particular interest to the consumer at that period of time.

In an embodiment, a method comprises executing, by a mobile device, a mobile application, wherein the mobile device comprises one or more accelerometers. The method comprises receiving, by the mobile device, acceleration data along one or more axes using one or more of the accelerometers associated with the mobile device. The method comprises comparing, by the mobile device, the acceleration data to a predetermined acceleration threshold stored by the mobile application. The method comprises determining, by the mobile device, whether the acceleration data along one or more axes satisfies the predetermined acceleration threshold within a predetermined period of time, wherein acceleration data that satisfies the predetermined acceleration threshold within a predetermined period of time represents a deceleration of the mobile device. The method comprises upon the acceleration data satisfying the predetermined threshold within the predetermined period of time, querying, by the mobile device, the mobile application for a notification, wherein the notification corresponds to a user profile associated with the mobile device. The method comprises displaying, by the mobile device, the notification.

In another embodiment, a method comprises executing, by a mobile device, a mobile application, wherein the mobile application comprises one or more accelerometers and a global positioning system. The method comprises receiving, by the mobile device, location data at fixed time intervals from the global positioning system. The method comprises monitoring, by the mobile device, acceleration data along one or more axes using the one or more of the accelerometers. The method comprises determining, by the mobile device, a distance interval that the mobile device has moved by comparing location data from the global positioning system. The method comprises comparing, by the mobile device, the distance interval to a predetermined distance threshold stored on the mobile device. The method comprises comparing, by the mobile device, the acceleration data to a predetermined acceleration threshold stored by the mobile application upon the distance interval satisfying the predetermined distance interval stored on the mobile device. The method comprises determining, by the mobile device, whether the acceleration data satisfies the predetermined acceleration threshold. The method comprises upon the acceleration data satisfying the predetermined threshold, querying, by the mobile device, the mobile application for a notification, wherein the notification corresponds to a user profile associated with the mobile device. The method comprises displaying, by the mobile device, the notification.

Another embodiment comprises a computer-readable medium storing a set of instructions configured to be executed by a processor associated with a mobile device, wherein the mobile device comprises one or more accelerometers. The set of instructions is configured to receive acceleration data along one or more axes using one or more of the accelerometers associated with the mobile device. The set of instructions is configured to compare the acceleration data to a predetermined acceleration threshold stored by the mobile application. The set of instructions is configured to determine whether the acceleration data along one or more axes satisfies the predetermined acceleration threshold within a predetermined period of time, wherein acceleration data that satisfies the predetermined acceleration threshold within a predetermined period of time represents at least one of deceleration and acceleration of the mobile device. The set of instructions is configured to upon the acceleration data satisfying the predetermined threshold within the predetermined period of time, query the mobile application for a notification, wherein the notification corresponds to a user profile associated with the mobile device. The set of instructions is configured to display the notification.

BRIEF DESCRIPTION OF THE DRAWINGS

The present disclosure can be better understood by referring to the following figures. The components in the figures are not necessarily to scale. The emphasis is instead placed upon illustrating the principles of the disclosure. In the figures, reference numerals designate corresponding parts throughout the different views.

DETAILED DESCRIPTION

Figure 1:
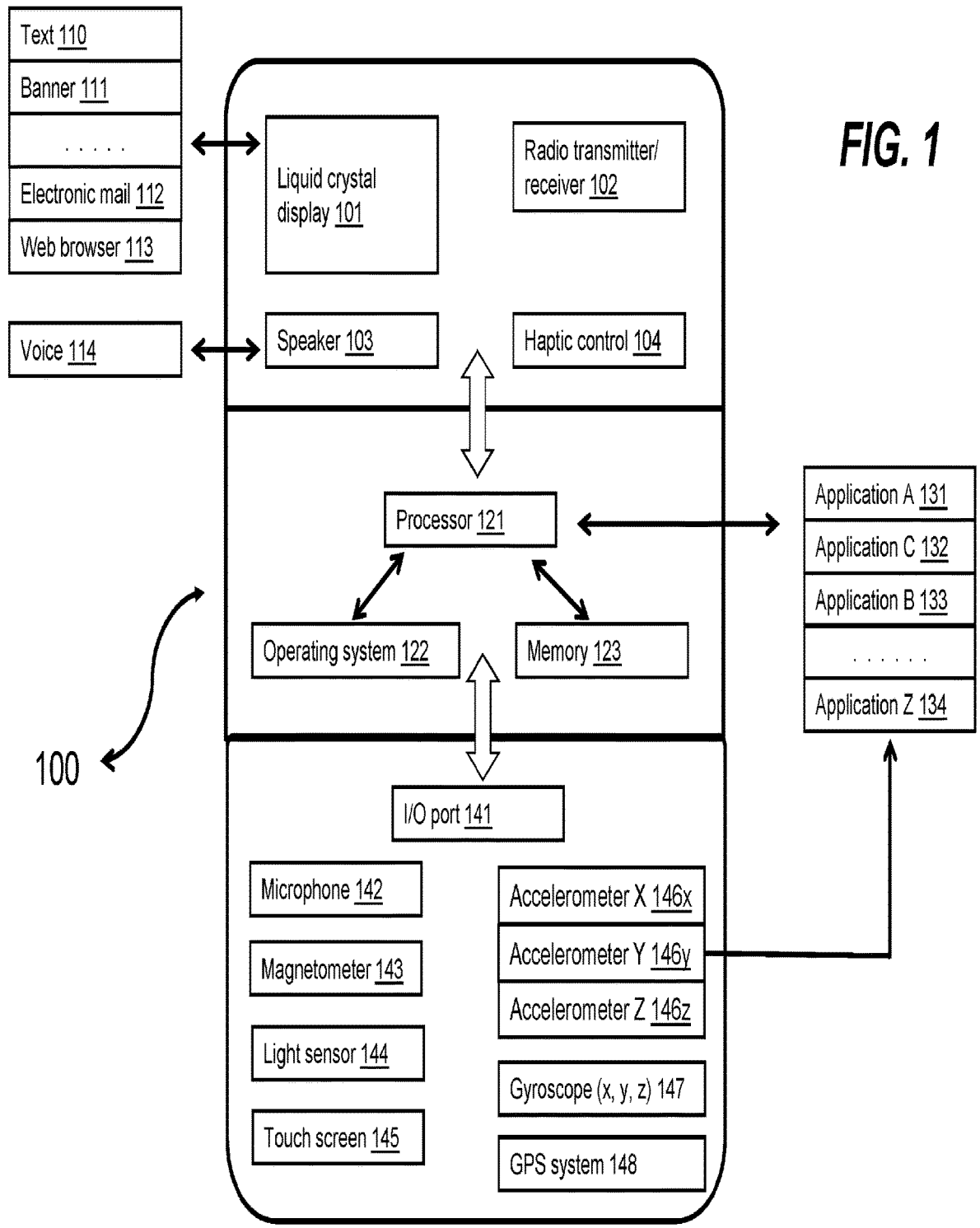
FIG. 1 illustrates a functional block diagram of a system architecture for presenting timely, event-related notifications on a mobile device, according to an exemplary embodiment.

The present disclosure is described here in detail with reference to embodiments illustrated in the drawings and specific language used to describe the same. Other embodiments may be used and/or other changes may be made without departing from the spirit or scope of the present disclosure. The illustrative embodiments described in detail here as offered as examples only, and are not meant to be limiting of the subject matter presented here. Alterations and further modifications of the inventive features illustrated here, and additional applications of the principles of the inventions as illustrated here, which would occur to one skilled in the relevant art and having possession of this disclosure, are to be considered within the scope of the invention.

Methods and software applications for presenting timely, event-related notifications to the user of a mobile device are disclosed. These methods and applications include using one or more accelerometers integrated in the user's mobile device to monitor the acceleration experienced by a mobile device, and hence by the user who is presumably carrying or traveling with it. For purposes of this discussion, the term acceleration may include an increase or decrease in speed, a change in direction, or a deceleration (negative acceleration). The processor in the mobile device will determine whether the acceleration exceeds a certain predetermined threshold, said threshold being selected as indicative of a rapid acceleration or deceleration. An acceleration in excess of that acceleration threshold may indicate that the mobile device user, or the vehicle he or she has been traveling in, has experienced an automobile accident or near-miss, has swerved abruptly to avoid an object, or has experienced a loss of control due to wet, icy, or poor road conditions or poor visibility, to name just a few examples.

The method may further include the processor triggering an alert when the processor determines the acceleration exceeds the acceleration threshold, and transmitting that alert to a mobile application loaded onto the mobile device. The mobile application may include a stand-alone application, or it may be part of a mobile application provided by the mobile device user's cell phone or Internet service provider, shopping network, or another business or institution. Upon receipt of the alert, the mobile application may transmit a notification to the user through any of various communications technologies available on the mobile device, such as a text, voice message, electronic mail. Said notification may offer a recommendation relevant to the rapid acceleration recently experienced by the user, such as a recommendation for tires or brake service. Said notification may be either predetermined or tailored to the user's potential interests, based on the user's profile information.

Figure 2:
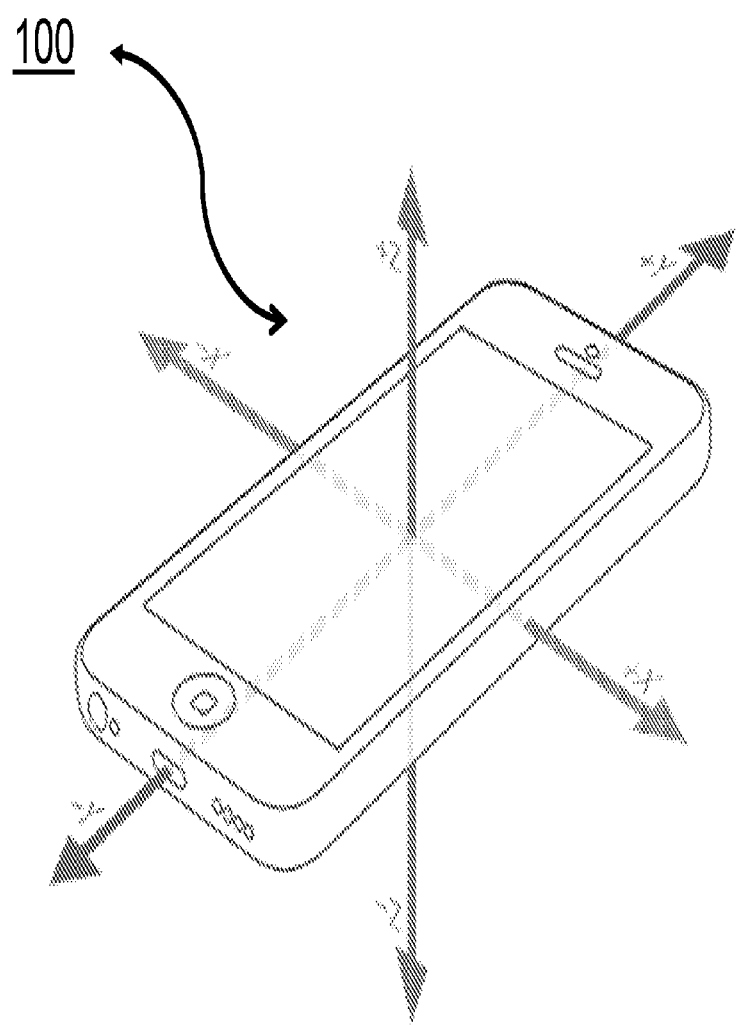
FIG. 2 illustrates an exemplary embodiment of a smart phone and the three axes along which the accelerometers monitor acceleration data.

FIG. 1 is a functional block diagram illustrating a system architecture for presenting real-time, event-related content to a mobile device user, according to an embodiment. In FIG. 1, the system architecture includes a mobile device 100, such as a mobile phone or smart phone, tablet, personal digital assistant (PDA), laptop, or other mobile device that includes one or more accelerometers. For purposes of illustration only and not limitation, the user's mobile device 100 in this embodiment may be referred to as a smart phone. A smart phone includes at least one accelerometer 146, and typically two or three accelerometers, to measure the acceleration along at least one of the orthogonal axes (x, y, z) in physical space. The accelerometers are denoted here 146x, 146y, and 146z for the respective axis along, which they are oriented. These three axes for a mobile device 100 are illustrated in FIG. 2. An accelerometer measures proper acceleration ("g-force"), which is the acceleration of an object relative to gravitational free fall. For example, an accelerometer in free fall will thus detect an acceleration of zero. An accelerometer at rest on Earth will measure an acceleration of 9.8 m/s$^2$ upward (equal to the gravitational acceleration (g) of Earth) because the accelerometer must experience an upward force of 1G to counteract the downward force of gravity. A smart phone 100 typically includes other sensors for inputting information, such as one or more gyroscopes 147 for detecting rotational movement, a magnetometer 143 for detecting magnetic fields (e.g., for the compass), light sensors 144 (e.g., for the camera), a system for detecting and processing GPS signals 148 (e.g., for determining location and direction of travel), a touch pad 145, and a microphone 142 for detecting sound.

Each accelerometer 146x, 147y, and 146z is integrated into the hardware and operating system of the mobile device. A smart phone includes a processor 121, operating system 122 (such as iOS in the Apple iPhones or Android in certain other smart phones), memory 123, and software for performing its many functionalities. For example, the processor 121 in a smart phone receives data from the accelerometers 146x, 146y, and 146z, processes that data to determine the orientation of the device, and then determines whether to change the display from portrait to landscape, or vice versa. The accelerometer and other sensor data in an iPhone may be accessed and processed using the Core Motion Framework (a C-based programming language) or any other applicable programming language. The CMMotionActivity class, for example, contains the data for a single motion update event, while the CMSensorRecorder class controls the gathering and retrieval of accelerometer data from a mobile device. The CMMotionManager class provides both "push" and "pull" access to all of the motion data on an iOS device. To "pull" motion data, the current status of the sensor data or composited data can be accessed as read-only properties of CMMotionManager. To receive "pushed" data, the desired data can be collected with a block or closure that receives updates at a specified interval, which can be programmed (in seconds) using "accelerometerUpdateInterval." For example, a shorter interval for updating accelerometer data may be selected for higher responsiveness or sensitivity, while a longer update interval may be selected to reduce CPU usage. Higher sensitivity may also be accomplished by combining the accelerometer data with data from the gyroscopes or other sensors as well.

A smart phone 100 also includes a bidirectional radio transmitter/receiver 102 that enables the smart phone to send and receive information wirelessly via a cell tower or wireless router to another device, server, or network (e.g., LAN, WAN, VPN, or WWW, among others). The user may use his or her smart phone 100 to communicate through any of a number of communication technologies, such as text 110 (e.g., SMS, MMS), a banner 111 on the liquid crystal display 101, electronic mail 112, web browsing 113, voice or voice mail 114, to name a few. In some cases, the software for operating these functions is installed on the smart phone 100; in other cases, software may be downloaded or modified by the user of the smart phone.

In particular, the user may personalize the functionality of his or her smart phone by downloading various mobile applications, e.g., 131, 132, 133, 134, such as mobile applications for various different entities associated with the user. When a user downloads an application on the smart phone, it is integrated with the device's existing operating system 122 and other software to perform its intended operations, such as accepting input from the keypad, accessing the radio transmitter, transmitting and receiving information to and from the Internet, displaying text and video information on the liquid crystal display, and performing other operations. For example, the user may use a mobile application to access her account information associated with an entity. Such activities are typically referred to as "pull" activities, in the sense that the user is "pulling" information from the entity. The entity may also send her a message regarding her account via her mobile device, e.g., through a message-board in the mobile application or through electronic mail, such as advising her that payment is coming due, her account is overdrawn or contains insufficient funds, or offering her certain products or services that may be of interest. Such activities may be referred to as "push" activities, in the sense that the entity is "pushing" information to the user. Most mobile applications are typically capable of both "push" and "pull" capabilities.

Figure 3:
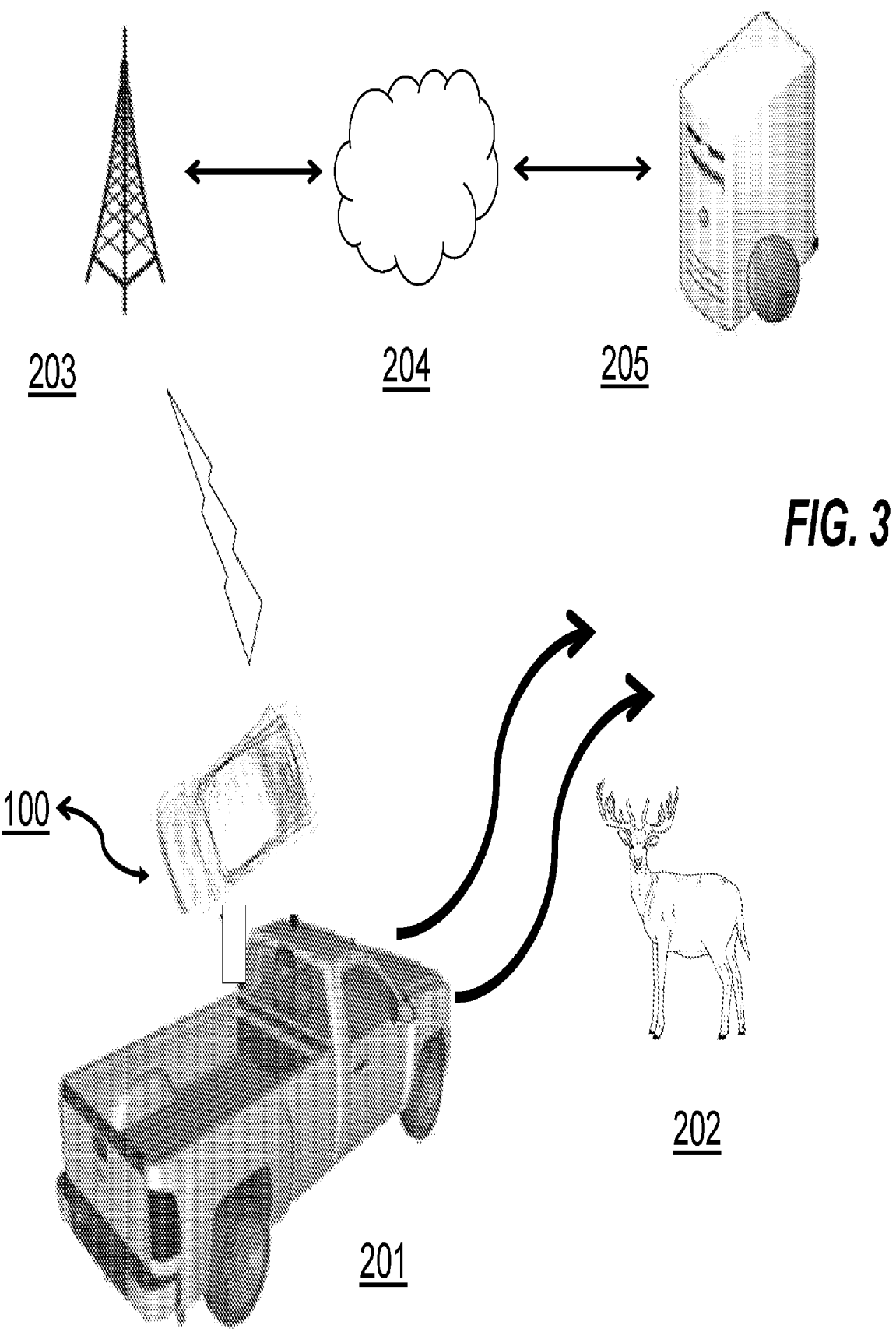
FIG. 3 illustrates a functional block diagram for using the accelerometers in a smart phone to monitor the accelerative forces experienced by the user of the smart phone.

In one embodiment, the user downloads a mobile application that is programmed to communicate with the smart phone's accelerometers 146x, 146y, and 146z and integrate its data monitoring with the application's data input, processing, and communications functions on the smart phone. The accelerometers on the smart phone serve as proxies for monitoring the acceleration experienced by the user of the smart phone, as a user typically leaves her smart phone turned on at almost all times and typically carries it with her when she travels, as illustrated in FIG. 3. In this example, if the user swerves to avoid a deer 202 or other obstacle, or abruptly slows down to avoid a collision, the rapid change in acceleration or deceleration will be recorded by the accelerometers in the user's smart phone 100. When traveling, a smart phone is often, but not always, in wireless communication with a cell tower 203, which is connected to the Internet (such as network 204 or other network). The institution that has provided the mobile application to the user typically has servers 205 connected to the worldwide web 204, which are capable of communicating with the user on his or her mobile device, storing information about the user and his or her accounts, and sending or receiving instructions, data, or other information to the user through the mobile application or other means (e.g., electronic mail or web).

Figure 4:
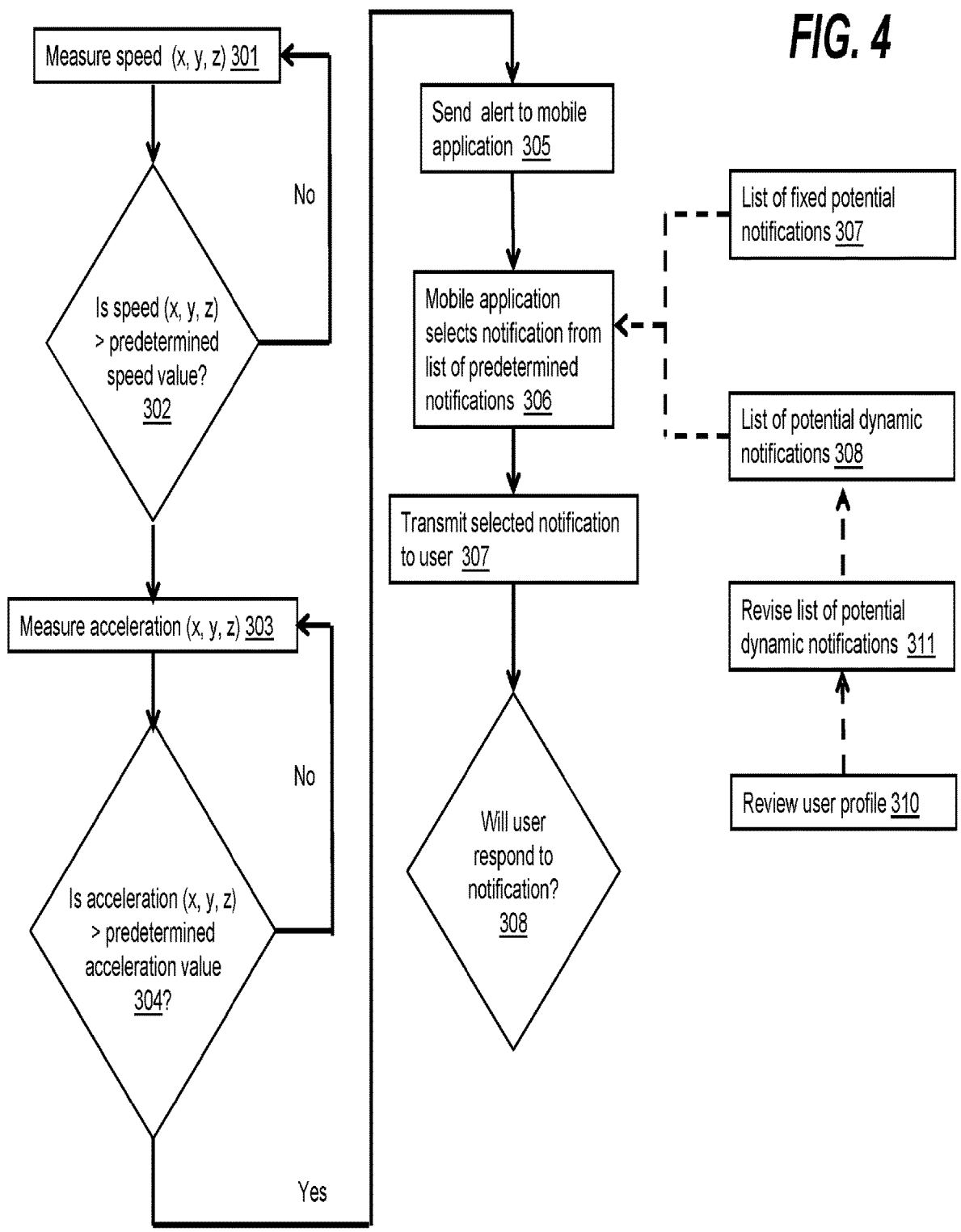
FIG. 4 illustrates a flowchart of a method for providing timely, event-related notifications on a mobile device, according to an exemplary embodiment.

FIG. 4 illustrates a flow chart for an exemplary method of providing timely, event-related notifications on a mobile device. In step 303, the acceleration data along one or more orthogonal axes (x, y, z) of the smart phone is monitored by the accelerometers and sent to the processor. In one embodiment, the processor is continually monitoring the acceleration data, but this type of continual monitoring may be unnecessary given the user is not always traveling in a vehicle. Continual monitoring according to the invention may also tie up processing power and shorten battery life. In another embodiment, the processor monitors the acceleration data only when the speed or the distance travelled of the smart phone, as determined by the rate of change of position (e.g., location data received form a GPS system associated with the smart phone), exceeds a certain threshold. In this embodiment, the processor monitors the distance traveled by the smart phone or the effective speed of the vehicle (associated with the smart phone) by monitoring location data gathered from the GPS associated with the smart phone and determines the change in location of the smart phone and the distance and the speed travelled. In step 302, the processor compares the distance the vehicle has traveled (or its speed) during a predetermined interval and compares that distance (or speed) to a predetermined distance or speed threshold. If the processor determines the mobile device 100 is traveling faster than the predetermined speed threshold or the distance traveled is more than a predetermined threshold, the processor will begin monitoring the acceleration data as described above. If the processor determines the mobile device 100 is traveling more slowly than the predetermined speed threshold, the processor will not monitor the acceleration data. This will limit application of the invention to those periods of time when the user is mostly likely to be carrying his or her smart phone while traveling in a vehicle.

Returning to FIG. 4, in step 304 the processor compares the acceleration data to a predetermined acceleration threshold. For example, a smart phone that is dropped and bounces off the floor may detect an acceleration of approximately 2Gs along one or more axes. When a driver makes a sudden stop, as when she seeks to avoid a collision, the accelerometer in the smart phone she is carrying may register approximately 4Gs or more. Thus, in an exemplary embodiment, an acceleration threshold of 3G may be an appropriate threshold for determining whether the user of the smart phone has experienced an unusually strong or rapid acceleration or deceleration in an automobile. This threshold is intended to avoid false positives, which may be generated by random mishaps (e.g., dropping the smart phone) or which are not strong enough to indicate that the user has experienced or nearly avoided a serious incident in an automobile. In another embodiment, an acceleration threshold above 2G but below 2.5G may indicate the mobile device has been dropped but was not traveling in an automobile that experienced an unusually rapid deceleration.

In an exemplary embodiment, this predetermined acceleration threshold may be fixed and programmed into the mobile application. In another embodiment, not shown, this maximum acceleration value may be determined by the user's acceleration history. For example, the processor may record the acceleration values experienced by the smart phone over a period of time, and then prepare a statistical analysis to identify the range of acceleration values most commonly experienced by the smart phone, and presumably by its user as well. The processor would use this range of acceleration values to determine the appropriate acceleration threshold. For example, if the user's history shows that he or she regularly experiences accelerations of up to 3G (due to his or her driving habits), then the processor may adjust the acceleration threshold from 3G to 3.5G, as appropriate. To avoid consuming excessive processing power, the mobile application may be programmed to perform this type of analysis periodically, e.g., once a day, or week, or month, as appropriate.

Returning to FIG. 4, if the processor in step 304 determines the smart phone's acceleration is below the acceleration threshold, the processor continues monitoring the acceleration data but takes no further action. If, however, the processor in step 304 determines the acceleration exceeds the acceleration threshold along at least one axis, then the processor transmits an alert signal to mobile application, as in step 305. This alert, in other words, is sent when the acceleration of the smart phone (and presumably its user) has experienced an unusually rapid acceleration or deceleration that has exceeded the maximum acceleration value considered to be safe or acceptable. For example, an unusually rapid acceleration or deceleration may be caused, for example, by an automobile accident, an abrupt stop to avoid a collision, swerving to avoid an object, or loss of control due to wet, icy, or poor road conditions, poor visibility, or other similar incident, as illustrated for example in FIG. 3. In an exemplary embodiment, an acceleration value along at least one axis is sufficient to trigger an alert. In another embodiment, the acceleration values along at least two axes must exceed the acceleration threshold to trigger an alert, in order to reduce the likelihood of false positives. In another embodiment, the acceleration must remain above the acceleration threshold for at least a predetermined period of time (e.g., 1 second) to reduce false positives.

Figure 5:
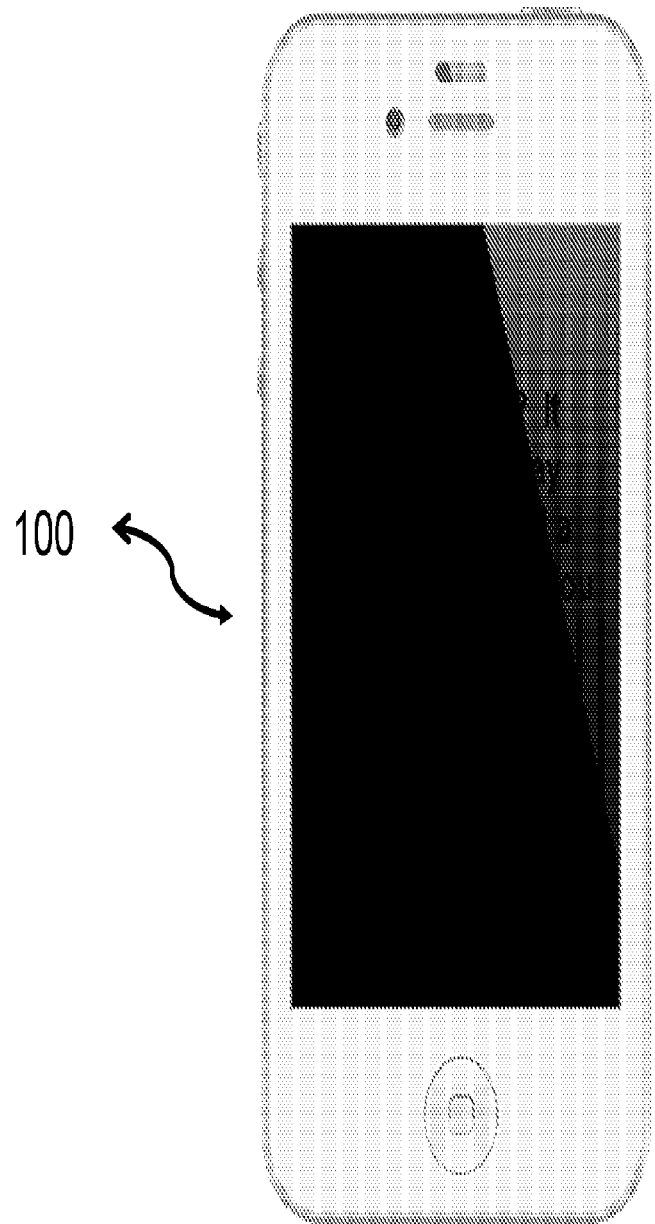
FIG. 5 illustrates a smart phone displaying a notification, according to an exemplary embodiment.

If the processor detects an unusually rapid acceleration (e.g., an acceleration or deceleration in excess of the predetermined acceleration threshold), the processor sends an alert to the mobile application of the user's smart phone, as in step 305. This mobile application may be a stand-alone application, or it may be part of a mobile application the user previously downloaded. In an exemplary embodiment, a set of predetermined "fixed" notifications 307 has been previously stored in the mobile application. As shown in FIG. 5, these predetermined notifications may include recommendations for auto-related products or services, such as:

"Are you alright? It looks like you may have experienced a serious incident. You should consider having your brakes [or tires] inspected. Here are some recommended dealers."

In another embodiment, the acceleration threshold may be set between 2G and 2.5G to indicate when the mobile device has merely been dropped, as opposed to experiencing a rapid deceleration in an automobile. In such an event, a different set of notifications may be appropriate, such as:

"It appears your mobile phone has been dropped. Consider buying a protective case."

These are only a few many potential notifications that may be triggered by the acceleration experienced by the mobile device. The processor, working through the mobile application, will select one or more of these predetermined notifications, as in step 306. The notification may be selected randomly, sequentially, or using some other algorithm. In step 307, the processor transmits the notification to the user using any of the communications modes available, such as a banner on the liquid crystal display, a text (e.g., SMS), voice message (e.g., using Siri on an Apple iPhone), electronic mail, or other mode. Each notification may include a link or other information to encourage the user to affirmatively respond to the notification. The processor may transmit this notification either immediately after the event in question, or it may be programmed to transmit the notification after a short delay (e.g., 5 minutes, 30 minutes, etc.) to avoid distracting the user.

In another embodiment, the mobile application may store a dynamic, or changeable, list of potential notifications, as in step 308. This list is refreshed whenever the user connects to his or her institution/service provider using the mobile application. For example, the entity associated with the mobile application may periodically change its list of potential notifications and download a new or revised list in response to its experiences with its customers, as in step 311. Or, the entity associated with the mobile application may refresh a user's list of potential notification in response to changes in the user's user profile or account history, as in step 310. For example, when the user uses her mobile application to access the entity associated with the mobile application, a server associated with the entity associated with the mobile application may automatically review the user's profile or account information in order to generate a more suitable notification (e.g., recommend products and services, which the user does not have or has not signed up for). For, if the user's account information shows that she has not purchased new tired for period of time (e.g., 1 year or more), then the server associated with the mobile application may revise its list of potential notifications to advise the user check her tires. The server may, in some embodiments, automatically download a revised list of notifications to the user's mobile application, e.g., while she is using the mobile application or as part of a periodic update of the mobile application. Above-mentioned embodiments are examples only and are not intended to limit the invention.

In an exemplary embodiment, the processor resets the mobile application after transmitting the notification to the user, but takes no further action with respect to the notification. The user may erase, disregard, or act upon the notification. In another embodiment, the processor may record where the user activates the web link embedded in the notification. The processor may then access the mobile application and delete the notification from the list of potential notifications, presumably because a user that has already taken action with respect to that notification and does not need to be reminded about it again. In another embodiment, the user's activation of the web link may be recorded by the entity's server (the entity, which provides the mobile application) the next time the user uses the mobile application to access the entity's server, so that the entity's server may automatically update the user's list of potential notifications.

Embodiments of the invention present several advantages over existing systems and methods. The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," and "etc.," are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. The invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:

receiving, by a server via an electronic device operated by a user within a moving automobile, an indication that the electronic device has satisfied a deceleration threshold corresponding to the electronic device's deceleration in at least one axis within a predetermined period of time while traveling more than a predetermined distance, wherein the electronic device comprises an accelerometer and is configured to monitor deceleration data associated with the electronic device along a plurality of axes associated with the electronic device by periodically receiving deceleration data from the accelerometer; and causing, by the server, the electronic device to display a notification corresponding to a profile of the user and a value of deceleration of the electronic device in at least one axis of the electronic device.

2. The method of claim 1, wherein the server identifies the distance traveled by the electronic device via a global positioning system in communication with the electronic device.

3. The method of claim 1, wherein the notification corresponds to at least one of the deceleration and distance of the electronic device.

4. The method of claim 1, wherein the notification relates to automobile brake services, tire services, or other services relevant to experiencing a deceleration that satisfies deceleration threshold.

5. The method of claim 1, wherein the notification comprises a link prompting the user to respond to the notification.

6. The method of claim 5, wherein the link directs the electronic device to an advertisement.

7. The method of claim 1, wherein the notification is displayed on the electronic device after a pre-determined period of time.

8. The method of claim 1, wherein the server displays the notification when the deceleration occurs within a predetermined time period.

9. The method of claim 1, wherein the notification further corresponds to a location associated with the electronic device.

10. The method of claim 1, wherein the deceleration threshold is dynamically modified, by the server, based on an acceleration history of the electronic device.

11. A computer system comprising:
   an electronic device operated by a user within a moving automobile, the electronic device comprising an accelerometer and is configured to monitor deceleration data associated with the electronic device along a plurality of axes associated with the electronic device by periodically receiving deceleration data from the accelerometer; and
   a server in communication with the electronic device, the server configured to:
      receive, via the electronic device, an indication that the electronic device has satisfied a deceleration threshold corresponding to the electronic device's acceleration in at least one axis within a predetermined period of time while traveling more than a predetermined distance; and
      cause the electronic device to display a notification corresponding to a profile of the user and a value of deceleration of the electronic device in at least one axis of the electronic device.

12. The system of claim 11, wherein the server identifies the distance traveled by the electronic device via a global positioning system in communication with the electronic device.

13. The system of claim 11, wherein the notification corresponds to at least one of the deceleration and distance of the electronic device.

14. The system of claim 11, wherein the notification relates to automobile brake services, tire services, or other services relevant to experiencing an acceleration that satisfies the deceleration threshold.

15. The system of claim 11, wherein the notification comprises a link prompting the user to respond to the notification.

16. The system of claim 15, wherein the link directs the electronic device to an advertisement.

17. The system of claim 11, wherein the notification is displayed on the electronic device after a pre-determined period of time.

18. The system of claim 11, wherein the server displays the notification when the deceleration occurs within a predetermined time period.

19. The system of claim 11, wherein the notification further corresponds to a location associated with the electronic device.

20. The system of claim 11, wherein the deceleration threshold is dynamically modified, by the server, based on an acceleration history of the electronic device.

* * * * *